(12) United States Patent
Fadhel et al.

(10) Patent No.: US 10,688,686 B2
(45) Date of Patent: Jun. 23, 2020

(54) SIMULTANEOUS CEMENT ENHANCEMENT AND CARBON DIOXIDE UTILIZATION BY MOUNTING A CARBON DIOXIDE CAPTURE SYSTEM ONBOARD A CONCRETE MIXER VEHICLE

(71) Applicant: Saudi Arabian Oil Company, Dhahran (SA)

(72) Inventors: Bandar Fadhel, Dhahran (SA); Ahmad D. Hammad, Dhahran (SA); Issam T. Amr, Khobar (SA); Rami A. Bamagain, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 164 days.

(21) Appl. No.: 15/828,839

(22) Filed: Dec. 1, 2017

(65) Prior Publication Data
US 2019/0168417 A1 Jun. 6, 2019

(51) Int. Cl.
| | |
|---|---|
| *C04B 7/00* | (2006.01) |
| *B28C 5/42* | (2006.01) |
| *C04B 28/10* | (2006.01) |
| *B28C 5/46* | (2006.01) |
| *B01D 53/02* | (2006.01) |
| *B01D 53/14* | (2006.01) |
| *B01D 53/62* | (2006.01) |

(Continued)

(52) U.S. Cl.
CPC ............... *B28C 5/42* (2013.01); *B01D 53/02* (2013.01); *B01D 53/1475* (2013.01); *B01D 53/62* (2013.01); *B28C 5/4203* (2013.01); *B28C 5/46* (2013.01); *B28C 7/0046* (2013.01); *B28C 7/04* (2013.01); *C04B 28/10* (2013.01); *C04B 40/0231* (2013.01); *B01D 2251/604* (2013.01); *B01D 2251/606* (2013.01); *B01D 2252/102* (2013.01); *B01D 2252/204* (2013.01); *B01D 2253/102* (2013.01); *B01D 2253/108* (2013.01); *B01D 2253/204* (2013.01); *B01D 2257/504* (2013.01)

(58) Field of Classification Search
USPC .................................................. 106/638, 692
See application file for complete search history.

(56) References Cited

U.S. PATENT DOCUMENTS

| 4,199,002 | A | 4/1980 | Fumagalli |
| 9,108,883 | B2 * | 8/2015 | Forgeron ............... B29B 7/603 |

(Continued)

FOREIGN PATENT DOCUMENTS

| CN | 106 626 073 A | 5/2017 |
| JP | S57 199415 | 12/1982 |
| JP | H06 6-22074 | 3/1994 |

OTHER PUBLICATIONS

International Search Report and Written Opinion pertaining to International Application No. PCT/US2018/040575.

*Primary Examiner* — James E McDonough
(74) *Attorney, Agent, or Firm* — Dinsmore & Shohl, LLP

(57) ABSTRACT

A vehicle $CO_2$ capture and utilization system includes a concrete mixer vehicle and a vehicle exhaust capture system. The concrete mixer vehicle comprises a vehicle exhaust and a mixer tank. The vehicle exhaust capture system is located onboard the concrete mixer vehicle. Additionally, the vehicle exhaust capture system includes one or more fluid pathways that fluidly couple the vehicle exhaust and the mixer tank.

17 Claims, 3 Drawing Sheets

(51) Int. Cl.
*B28C 7/00* (2006.01)
*B28C 7/04* (2006.01)
*C04B 40/02* (2006.01)
C04B 7/34 (2006.01)
C04B 28/00 (2006.01)
C04B 32/00 (2006.01)
C04B 7/32 (2006.01)
C04B 7/36 (2006.01)
C04B 9/11 (2006.01)
C04B 11/28 (2006.01)
C04B 28/06 (2006.01)

(56) References Cited

U.S. PATENT DOCUMENTS

| | | |
|---|---|---|
| 9,180,401 B2 | 11/2015 | Hamad |
| 9,371,755 B2 | 6/2016 | Hamad |
| 9,388,072 B2 * | 7/2016 | Niven ................. C04B 7/26 |
| 2010/0251937 A1 * | 10/2010 | Murray ................. B01D 53/02 |
| | | 106/705 |
| 2011/0289901 A1 * | 12/2011 | Estes ................. C04B 28/02 |
| | | 60/274 |
| 2013/0220130 A1 | 8/2013 | Ihms et al. |
| 2013/0298532 A1 | 11/2013 | Hamad et al. |
| 2013/0298761 A1 | 11/2013 | Hamad |

\* cited by examiner

SIMULTANEOUS CEMENT ENHANCEMENT AND CARBON DIOXIDE UTILIZATION BY MOUNTING A CARBON DIOXIDE CAPTURE SYSTEM ONBOARD A CONCRETE MIXER VEHICLE

BACKGROUND

The present disclosure relates to a vehicle $CO_2$ capture and utilization system. More specifically, the present disclosure introduces technology for a vehicle $CO_2$ capture and utilization system that includes a vehicle exhaust system located onboard a concrete mixer vehicle.

BRIEF SUMMARY

According to the subject matter of the present disclosure, a vehicle $CO_2$ capture and utilization system includes a concrete mixer vehicle and a vehicle exhaust capture system. The concrete mixer vehicle comprises a vehicle exhaust and a mixer tank. The vehicle exhaust capture system is located onboard the concrete mixer vehicle. Additionally, the vehicle exhaust capture system includes one or more fluid pathways that fluidly couple the vehicle exhaust and the mixer tank.

In accordance with one embodiment of the present disclosure, a vehicle $CO_2$ capture and utilization system includes a concrete mixer vehicle and a vehicle exhaust capture system. The concrete mixer vehicle includes a combustion engine, a vehicle exhaust, and a mixer tank. The vehicle exhaust capture system includes one or more fluid pathways that fluidly couple the vehicle exhaust and the mixer tank. The vehicle exhaust capture system includes a $CO_2$ capture unit that is located onboard the concrete mixer vehicle and is fluidly coupled to the vehicle exhaust and the mixer tank using the one or more fluid pathways. The vehicle exhaust capture system includes a $CO_2$ storage tank that is fluidly coupled to the vehicle exhaust using the one or more fluid pathways and is located onboard the concrete mixer vehicle. The one or more fluid pathways include a first fluid pathway extending from the vehicle exhaust to the $CO_2$ capture unit, a second fluid pathway extending from the $CO_2$ capture unit to the mixer tank, and a third fluid pathway extending from the $CO_2$ capture unit to the $CO_2$ storage tank. Additionally, a first flow generation unit is fluidly coupled to the second fluid pathway and is structurally configured to generate fluid flow from the $CO_2$ capture unit to the mixer tank and a second flow generation unit is fluidly coupled to the third fluid pathway and is structurally configured to generate fluid flow from the $CO_2$ capture unit to the $CO_2$ storage tank.

In accordance with another embodiment of the present disclosure, a method of carbonizing a cementitious material mixture includes generating $CO_2$ emission using a concrete mixer vehicle, the concrete mixer vehicle comprising a vehicle exhaust and a mixer tank. The mixer tank houses an uncured cementitious material mixture. The method also includes introducing at least a portion of the $CO_2$ emission generated by the concrete mixer vehicle and output by the vehicle exhaust into the mixer tank via one or more fluid pathways fluidly coupled to the vehicle exhaust and the mixer tank, such that $CO_2$ mixes with the uncured cementitious material mixture thereby carbonizing the uncured cementitious material mixture and forming $CaCO_3$ in the mixer tank.

Although the concepts of the present disclosure are described herein with primary reference to some specific vehicle $CO_2$ capture and utilization system configurations, it is contemplated that the concepts will enjoy applicability to vehicle $CO_2$ capture and utilization systems having any configuration.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
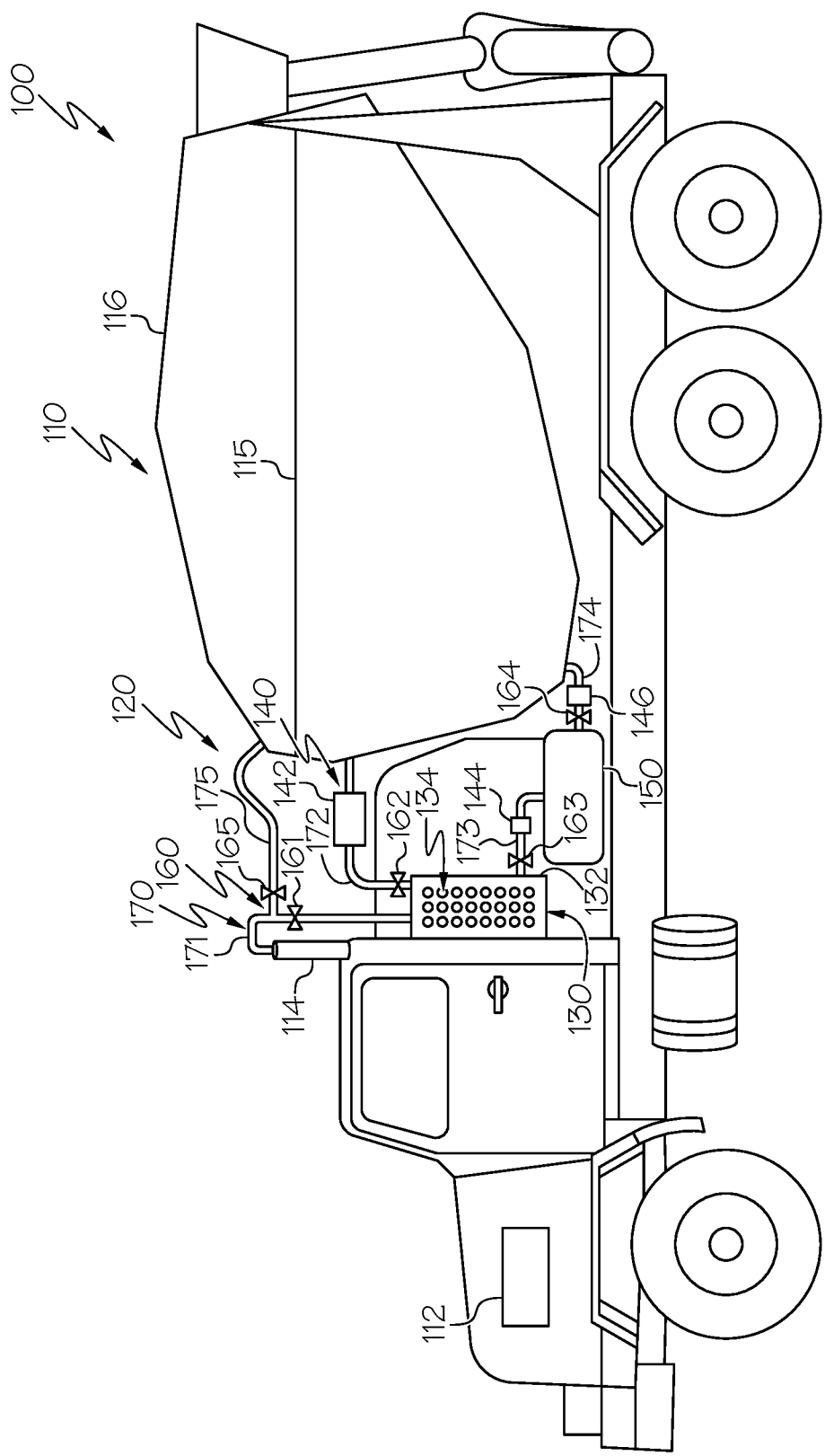
FIG. 1 is a schematic illustration of a vehicle $CO_2$ capture and utilization system comprising a vehicle exhaust capture system onboard a concrete mixer vehicle according to one or more embodiments shown and described herein.

FIG. 1 is a schematic illustration of a vehicle carbon dioxide ($CO_2$) capture and utilization system 100. The vehicle $CO_2$ capture and utilization system 100 comprises a concrete mixer vehicle 110 and a vehicle exhaust capture system 120. The concrete mixer vehicle 110 includes a combustion engine 112 fluidly coupled to a vehicle exhaust 114 such that emission generated by the combustion engine 112 is output by the vehicle exhaust 114. The combustion engine 112 may comprise a gasoline engine, a diesel engine, or any other known or yet-to-be developed engine configured to output emissions comprising $CO_2$. For example, the emissions may comprise from about 1% $CO_2$ to about 30% $CO_2$, for example about 2% $CO_2$ to about 25% $CO_2$, 3% $CO_2$ to about 25% $CO_2$, 5% $CO_2$ to about 15% $CO_2$, and any values, ranges, and sub-ranges therebetween. The concrete mixer vehicle 110 also includes a mixer tank 116 that may house a cementitious material mixture 115, for example, an uncured cementitious material mixture 115. While not intended to be limited by theory, the uncured cementitious material mixture 115 may comprise from about 10% to about 15% cement, from about 60% to about 75% aggregate material, from about 15% to about 20% water, and from about 0% to about 8% entrained air (for example about 5 to 8%). As a non-limiting example, the aggregate material may comprise one or more of sand, gravel, stone, slag, recycled concrete, clay, pumice perlite, vermiculite, or the like.

Further, the mixer tank 116 may be a rotatable mixer tank. In operation, rotation of the mixer tank 116 may slow the curing process such that uncured cementitious material mixture 115 may be unloaded from the mixer tank 116 into a desired curing location (i.e. a location in which cured concrete is desired, such as a construction site) and thereafter cured. In some embodiments, the mixer tank 116 may comprise a volume of from about 5 cubic meters to about 15 cubic meters, for example, about 6 cubic meters, 8 cubic meters, 9 cubic meters, 10 cubic meters, 12 cubic meters, or the like.

As depicted in FIG. 1, the vehicle exhaust capture system 120 is located onboard the concrete mixer vehicle 110. The vehicle exhaust capture system 120 comprises one or more fluid pathways 170, a $CO_2$ capture unit 130 structurally configured to capture $CO_2$ and release CO2 on-demand, and a $CO_2$ storage tank 150 structurally configured to store $CO_2$. The $CO_2$ capture unit 130 and the $CO_2$ storage tank 150 are each located onboard the concrete mixer vehicle 110. The vehicle exhaust capture system 120 further comprises one or more flow generation units 140 fluidly coupled to at least one of the one or more fluid pathways 170 and configured to generate fluid flow within at least one or the one or fluid pathways 170. The one or more flow generation units 140 may comprise mass flow controllers, relief valves, pressure controllers and cylinders, any combination thereof, or the like. In operation, the vehicle exhaust capture system 120 is configured to sequester $CO_2$ emitted by the concrete mixer vehicle 110, thereby preventing $CO_2$ emitted by the concrete mixer vehicle 110 from entering atmosphere, reducing pollution generated by the concrete mixer vehicle 110. In the embodiments described herein, $CO_2$ may be sequestered by directly introducing the $CO_2$ emission into the mixer tank 116, capturing the $CO_2$ emission with a $CO_2$ capture unit 130 for later introduction into the mixer tank 116, or capturing and storing the $CO_2$ emission, for example, in the $CO_2$ storage tank 150.

While not intended to be limited by theory, $CO_2$ (such as $CO_2$ from emissions) introduced into the mixer tank 116 may serve as a curing agent for the uncured cementitious material mixture 115 housed within the mixer tank 116. For example, $CO_2$ captured from emissions may mix with the cementitious material mixture 115 housed within the mixer tank 116, thereby carbonizing the cementitious material mixture 115 and forming $CaCO_3$ in the mixer tank 116 (e.g., adding a carbonate such as $CaCO_3$ to the cementitious material mixture 115), which is a thermodynamically stable carbonate. The carbonation reaction can be expressed as $Ca(OH)_2 + CO_2 \rightarrow CaCO_3 + H_2O$. Thus, when the cementitious material mixture 115 is applied to the desired curing location, the $CaCO_3$ of the cementitious material mixture 115 may facilitate curing of the cementitious material mixture 115 into cured concrete. While not intending to be limited by theory, adding $CO_2$ to the cementitious material mixture 115 to form $CaCO_3$ may reduce the curing time and improve the strength of the cured concrete formed from the carbonized cementitious material mixture 115. In particular, carbonizing the cementitious material mixture 115 may expedite the increase in the mechanical strength of the cured concrete formed from the cementitious material mixture 115 by accelerating and enhancing the formation of $CaCO_3$, which provides rigidity to the cured concrete formed from the cementitious material mixture 115.

Figure 2:
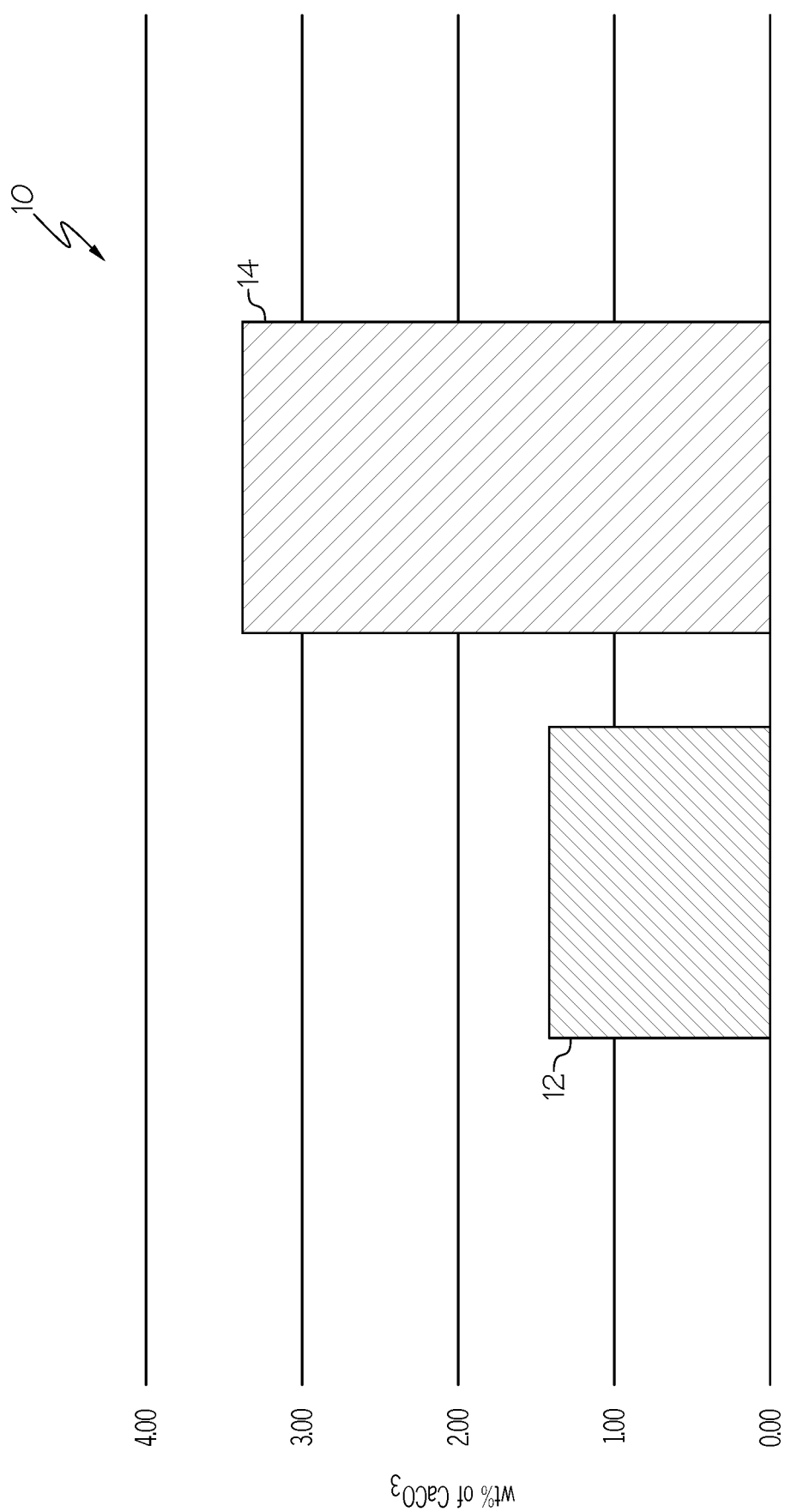
FIG. 2 is a graphical illustration of a weight percent of a carbonate formed in a cementitious material mixture after curing with the addition of $CO_2$ and without the addition of $CO_2$, according to one or more embodiments shown and described herein.

As an illustrative example, FIG. 2 shows a graph 10 that depicts the weight percent of carbonate (e.g., $CaCO_3$) formed in the cementitious material mixture 115 after 8 hours curing with the addition of 10% $CO_2$ (as shown by bar 14), for example, $CO_2$ captured from the vehicle exhaust 114, and after 8 hours curing in air without the addition of $CO_2$ (as shown by bar 12). As depicted, about twice the amount of $CaCO_3$ is formed when 10% $CO_2$ is added (bar 14) than when no $CO_2$ is added (bar 12). While not intending to be limited by theory, increasing the concentration of $CaCO_3$ in the cementitious material mixture 115 increases the mechanical strength of the cured concrete formed from the cementitious material mixture 115. For example, the cementitious material mixture 115 after 8 hours curing with the addition of 10% $CO_2$ (bar 14) has a mechanical strength of about 12 MPa and the cementitious material mixture 115 after 8 hours curing in air without the addition of $CO_2$ (bar 12) has a mechanical strength of about 2 MPa. Further, using $CO_2$ captured from emissions to carbonize the cementitious material mixture 115 may reduce or eliminate the need for specialized facilities and processes to unload captured $CO_2$ from the concrete mixer vehicle 110, thus reducing cost and saving time.

Moreover, the vehicle exhaust capture system 120 may sequester $CO_2$ emitted by the concrete mixer vehicle 110 even when $CO_2$ introduction into the mixer tank 116 is not desired, for example, by storing the $CO_2$ in the $CO_2$ capture unit 130, the $CO_2$ storage tank 150, or both. Example instances in which $CO_2$ introduction into the mixer tank 116 is not desired include when the mixer tank 116 is not housing a cementitious material mixture 115, when the mixer tank 116 is housing a cementitious material mixture 115 but carbonization is not yet needed, or when the mixer tank 116 is housing a cementitious material mixture 115 that is already been carbonized.

Referring again to FIG. 1, the one or more fluid pathways 170 are fluidly coupled to various components of the concrete mixer vehicle 110 and the vehicle exhaust capture system 120. The fluid pathways 170 may comprise hoses, tubes, pipes, or any other known or yet-to-be developed components that provide a pathway for fluid transfer though a system. As used herein, when two components are "fluidly coupled," fluid may flow from a first component, through one or more fluid pathways, through one or more additional intervening structures (if any), and reach the second component. For example, the one or more fluid pathways 170 fluidly couple the vehicle exhaust 114 and the mixer tank 116 such that when the concrete mixer vehicle 110 generates emissions comprising $CO_2$, at least a portion of the $CO_2$ may be introduced into the mixer tank 116. Further, the one or more flow generation units 140 may induce fluid flow within the one or more fluid pathways 170 and the vehicle exhaust capture system 120 may further comprise one or more valves 160 coupled to some or all of the fluid pathways 170 to control fluid flow through the one or more fluid pathways 170.

In the embodiments depicted in FIG. 1, the one or more fluid pathways 170 comprise a first fluid pathway 171 that extends between and fluidly couples the vehicle exhaust 114 and the $CO_2$ capture unit 130, such that $CO_2$ emitted by the vehicle exhaust 114 may be captured and stored by the $CO_2$ capture unit 130 and a second fluid pathway 172 that extends between and fluidly couples the $CO_2$ capture unit 130 and the mixer tank 116 such that $CO_2$ stored in the $CO_2$ capture unit 130 may be introduced into the mixer tank 116. A first valve 161 may be coupled to the first fluid pathway 171 and a second valve 162 may be coupled to the second fluid pathway 172. The first valve 161 and the second valve 162 are each actuatable between an open state and a closed state. The first valve 161 may be used in embodiments that comprise an additional fluid pathway (e.g., a fifth fluid pathway 175) that extends between the first fluid pathway 171 and the mixer tank 116, thereby providing a direct pathway between the vehicle exhaust 114 and the mixer tank 116. Further, the second valve 162 may be actuated into the closed state to prevent $CO_2$ from traveling from the $CO_2$ capture unit 130 into the mixer tank 116, for example, when no cementitious material mixture 115 is housed within the mixer tank 116 or when a carbonization reaction is not desired within the mixer tank 116. Moreover, a first flow generation unit 142 may be coupled to the second fluid pathway 172 and in operation may induce fluid flow from the $CO_2$ capture unit 130 to the mixer tank 116. In some embodiments, the second fluid pathway 172 may extend through the first flow generation unit 142 and in other embodiments, the first flow generation unit 142 may separate the second fluid pathway 172 into multiple, fluidly coupled segments.

In embodiments comprising the $CO_2$ storage tank 150, the one or more fluid pathways 170 may further comprise a third fluid pathway 173 extending between and fluidly coupling the $CO_2$ capture unit 130 and the $CO_2$ storage tank 150 such that $CO_2$ may be moved from the $CO_2$ capture unit 130 to the $CO_2$ storage tank 150, which provides additional storage. For example, more $CO_2$ may be emitted by the concrete mixer vehicle 110 than is required to carbonize the cementitious material mixture 115 housed within the mixer tank 116. The $CO_2$ storage tank 150 allows this extra $CO_2$ to be stored and prevented from entering the atmosphere. In some embodiments, the $CO_2$ storage tank 150 may store $CO_2$ as a compressed gas, which may be off-loaded at a fueling station or other removal location.

Further, a third valve 163 may be coupled to the third fluid pathway 173 and is actuatable between the open state and the closed state. Positioning the third valve 163 in the closed state prevents $CO_2$ emissions housed in the $CO_2$ capture unit 130 from entering the $CO_2$ storage unit 150 and positioning the third valve 163 in the open state allows $CO_2$ emissions to travel from the $CO_2$ capture unit 130 to the $CO_2$ storage unit 150. Moreover, a second flow generation unit 144 may be coupled to the third fluid pathway 173 and in operation may induce fluid flow from the $CO_2$ capture unit 130 to the $CO_2$ storage unit 150. In some embodiments, the third fluid pathway 173 may extend through the second flow generation unit 144 and in other embodiments, the second flow generation unit 144 may separate the third fluid pathway 173 into multiple, fluidly coupled segments.

Referring still to FIG. 1, some embodiments may further include a fourth fluid pathway 174 that extends between and fluidly couples the $CO_2$ storage tank 150 and the mixer tank 116 such that $CO_2$ emissions stored in the $CO_2$ storage tank 150 may be introduced into the mixer tank 116. Other embodiments may not include the fourth fluid pathway 174. Embodiments that include the fourth fluid pathway 174 may also include a fourth valve 164 coupled to the fourth fluid pathway 174 and actuatable between the open state and the closed state. Positioning the fourth valve 164 in the closed state prevents $CO_2$ emissions stored in the $CO_2$ storage unit 150 from entering the mixer tank 116 and positioning the fourth valve 164 in the open state allows $CO_2$ emissions to travel from the $CO_2$ storage unit 150 to the mixer tank 116. Moreover, embodiments that include the fourth fluid pathway 174 may include a third flow generation unit 146 coupled to the fourth fluid pathway 174. In operation, the third flow generation unit 146 may induce fluid flow from the $CO_2$ storage unit 150 to the mixer tank 116. In some embodiments, the fourth fluid pathway 174 may extend through the third flow generation unit 146 and in other embodiments, the third flow generation unit 146 may separate the fourth fluid pathway 174 into multiple, fluidly coupled segments.

Some embodiments also include the fifth fluid pathway 175, which is coupled to the first fluid pathway 171 to provide a direct fluid pathway between the vehicle exhaust 114 and the mixer tank 116. The fifth fluid pathway 175 allows $CO_2$ emission to be directly introduced from the vehicle exhaust 114 to the mixer tank 116. A fifth valve 165 may be coupled to the fifth fluid pathway 175 and is actuatable between the open state and the closed state. Positioning the fifth valve 165 in the closed state prevents $CO_2$ emissions from traveling directly from the vehicle exhaust 114 to the mixer tank 116 and positioning the fifth valve 165 is the open state allows $CO_2$ emissions to travel from the $CO_2$ storage unit 150 to the mixer tank 116. Further, when the fifth valve 165 is in the open state and the first valve 161 is in the closed state, $CO_2$ emissions output from the vehicle exhaust 114 may travel directly from the vehicle exhaust 114 into the mixer tank 116.

It should be understood that while five fluid pathways are depicted in FIG. 1, the vehicle exhaust capture system 120 may comprise any combination of the depicted fluid pathways and may further comprise additional fluid pathways that are not depicted. It should also be understood that the fluid pathways may be connected to a variety of locations on the mixer tank 116 such that $CO_2$ may be introduced into different parts of the mixer tank 116, for example, to facilitate even distribution of $CO_2$ within the mixer tank 116.

Referring again to FIG. 1, the $CO_2$ capture unit 130 comprises a housing 132 and one or more carbon capturing structures 134 located within the housing 132. The one or more carbon capturing structures 134 are configured to capture $CO_2$ that contacts the one or more carbon capturing structures 134. In operation, the one or more carbon capturing structures 134 are configured to capture $CO_2$ via adsorption, absorption, membrane technology, or a combination thereof. In some embodiments, the one or more carbon capturing structures 134 may comprise amines, carbonate, ammonia, hydroxide, activated carbons, zeolites, metal organic frameworks, mesoporous structures, carbon capture filters, fibers, microporous structures, or the like. In particular, carbon capturing structures 134 comprising amines, carbonate, ammonia, hydroxide, or combinations thereof, may be used to capture $CO_2$ via absorption, activated carbons, zeolites, metal organic frameworks, mesoporous structures or combinations thereof, may be used to capture $CO_2$ via adsorption, and carbon capture filters, fibers, microporous structures or combinations thereof, may be used to capture $CO_2$ via membrane technology. Further, the one or more carbon capturing structures 134 are configured to release $CO_2$ under certain processing conditions. For example, at least a portion of the $CO_2$ captured by the carbon capturing structures 134 may be released from the carbon capturing structures 134 upon exposure to a fluid flow above a release flow rate generated by the first flow generation unit 142. Moreover, in some embodiments, captured $CO_2$ may be released thermally, electrically, or via pressure alteration. Thus, $CO_2$ may be introduced from the $CO_2$ capture unit 130 into the mixer tank 116 on-demand.

Figure 3:
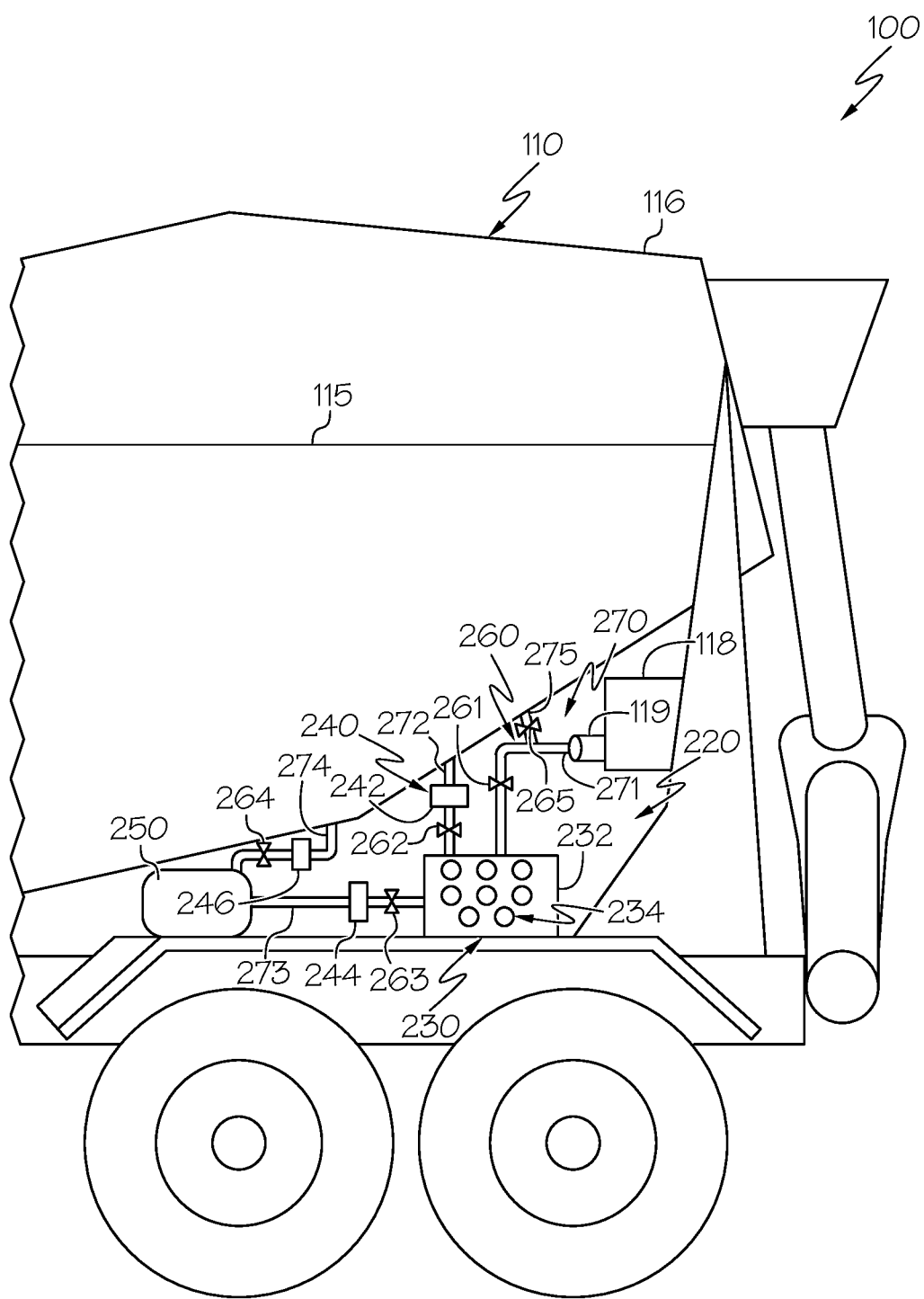
FIG. 3 is a schematic illustration of an auxiliary exhaust capture system according to one or more embodiments shown and described herein.

Referring now to FIG. 3, in some embodiments, the vehicle $CO_2$ capture and utilization system 100 may further comprise an auxiliary exhaust capture system 220 configured to capture $CO_2$ emissions generated by additional combustion engines located onboard the concrete mixer vehicle 110. For example, the concrete mixer vehicle 110 may comprise a concrete pump 118 fluidly coupled to the mixer tank 116 and configured to pump cementitious concrete material out of the mixer tank 116. Non-limiting examples of the concrete pump 118 include a concrete trailer pump, a concrete boom pump, a truck mounted concrete pump, or the like. In embodiments in which the concrete pump 118 comprises a combustion engine, the concrete pump 118 outputs $CO_2$ emission through a pump exhaust 119.

As depicted in FIG. 3, the auxiliary exhaust capture system 220 is located onboard the concrete mixer vehicle 110. The auxiliary exhaust capture system 220 comprises one or more fluid pathways 270 that fluidly couple the pump exhaust 119 and the mixer tank 116. In some embodiments, the auxiliary exhaust capture system 220 further comprises a $CO_2$ capture unit 230 and the $CO_2$ storage tank 250. The $CO_2$ capture unit 230 may comprise a housing 232 and one or more carbon capturing structures 234 and is structurally configured to capture $CO_2$ and release $CO_2$ on-demand and may comprise any of the embodiments of the $CO_2$ capture unit 130 described above. The $CO_2$ storage tank 250 is structurally configured to store $CO_2$ and may comprise any of the embodiments of the $CO_2$ storage tank 150 described above. The auxiliary exhaust capture system 220 may further comprise one or more flow generation units 240 fluidly coupled to at least one of the one or more fluid pathways 270 and configured to generate fluid flow within at least one of the one or fluid pathways 270. The one or more flow generation units 240 may comprise any of the embodiments of the flow generation units 140, described above, for example, mass flow controllers, relief valves, pressure controllers and cylinders, any combination thereof, or the like.

In some embodiments, the one or more fluid pathways 270 may directly fluidly couple the pump exhaust 119 to the mixer tank 116 or may fluidly couple the pump exhaust 119 to the mixer tank 116 via one or more intervening structures, such as the $CO_2$ capture unit 230 and/or the $CO_2$ storage tank 250. In other embodiments, the fluid pathways 270 may fluidly couple the pump exhaust 119 to the $CO_2$ capture unit 230 and/or the $CO_2$ storage tank 250 for storage and subsequent removal without fluidly coupling the pump exhaust 119 to the mixer tank 116.

Referring still to FIG. 3, the one or more fluid pathways 270 of the auxiliary exhaust capture system 220 may comprise an arrangement similar to the arrangement of the one or more fluid pathways 170 depicted in FIG. 1 and the auxiliary exhaust capture system 220 may also include one or more valves 260 similar to the one or more valves 160 of FIG. 1. For example, the one or more fluid pathways 270 may comprise a first fluid pathway 271 that extends between and fluidly couples the pump exhaust 119 and the $CO_2$ capture unit 230 and a second fluid pathway 272 that extends between and fluidly couples the $CO_2$ capture unit 230 and the mixer tank 116. A first valve 261 may be coupled to the first fluid pathway 271 and a second valve 262 may be coupled to the second fluid pathway 272. The first valve 261 and the second valve 262 are each actuatable between the open and closed state. Furthermore, a first flow generation unit 242 may be coupled to the second fluid pathway 272 and in operation may induce fluid flow from the $CO_2$ capture unit 230 and the mixer tank 116.

In embodiments comprising the $CO_2$ storage tank 250, the one or more fluid pathways 270 may further comprise a third fluid pathway 273 extending between and fluidly coupling the $CO_2$ capture unit 230 and the $CO_2$ storage tank 250. A third valve 163 may be coupled to the third fluid pathway 273 and is actuatable between the open state and the closed state. Moreover, a second flow generation unit 244 may be coupled to the third fluid pathway 273 and in operation may induce fluid flow from the $CO_2$ capture unit 230 and the $CO_2$ storage unit 250.

As depicted in FIG. 3, some embodiments may also include a fourth fluid pathway 274 that extends between and fluidly couples the $CO_2$ storage tank 250 and the mixer tank 116 such that $CO_2$ emissions stored in the $CO_2$ storage tank 150 may be introduced into the mixer tank 116. Embodiments that include the fourth fluid pathway 274 may also include the fourth valve 264 coupled to the fourth fluid pathway 274 and actuatable between the open state and the closed state. Embodiments that include the fourth fluid pathway 274 may also include a third flow generation unit 246 coupled to the fourth fluid pathway 274 that may induce fluid flow from the $CO_2$ storage unit 150 to the mixer tank 116. Some embodiments also include a fifth fluid pathway 275, which is coupled to the first fluid pathway 271 to provide a direct fluid pathway between the pump exhaust 119 and the mixer tank 116. A fifth valve 265 may be coupled to the fifth fluid pathway 275 and is actuatable between the open state and the closed state. It should be understood that while five fluid pathways are depicted in FIG. 2, the auxiliary exhaust capture system 220 may comprise any combination of the depicted fluid pathways and may further comprise additional fluid pathways that are not depicted.

Referring again to FIG. 1, a method of carbonizing the cementitious material mixture 115 housed within the mixer tank 116 of the concrete mixer vehicle 110 using the vehicle $CO_2$ capture and utilization system 100 is contemplated. The method comprises generating $CO_2$ emission using a concrete mixer vehicle 110 and introducing at least a portion of the $CO_2$ emission generated by the concrete mixer vehicle 110 and output by the vehicle exhaust 114 into the mixer tank 116. This $CO_2$ mixes with the uncured cementitious material mixture 115 to carbonize the uncured cementitious material mixture 115 and form $CaCO_3$ in the mixer tank 116.

In some embodiments, the method also includes capturing at least a portion of the $CO_2$ emission generated by the concrete mixer vehicle 110 using the $CO_2$ capture unit 130, for example before introducing $CO_2$ into the mixer tank 116. After capture, at least a portion of the $CO_2$ emission captured by the $CO_2$ capture unit 130 may be released from the $CO_2$ capture unit 130, to introduce the $CO_2$ into the mixer tank 116. For example, in the embodiment depicted in FIG. 1, releasing the $CO_2$ emission captured by the $CO_2$ capture unit 130 may comprise generating a fluid flow within the second fluid pathway 172 having a fluid flow rate greater than a release fluid flow rate using the first flow generation unit 142. Generating a fluid flow rate greater than the release fluid flow rate causes at least a portion of the $CO_2$ captured within the $CO_2$ capture unit 130 to flow from the $CO_2$ capture unit 130 to the mixer tank 116. In particular, the "release fluid flow rate" refers to a flow rate at or above which the $CO_2$ captured by the carbon capturing structures 134 of the $CO_2$ capture unit 130 is released from contact with the $CO_2$ capturing structures 134. Further, in embodiments comprising the $CO_2$ storage tank 150, the method may also include storing at least a portion of the $CO_2$ emission generated by the concrete mixer vehicle 110 in the $CO_2$ storage tank 150.

Referring again to FIG. 3, another method of carbonizing the cementitious material mixture 115 housed within the mixer tank 116 of the concrete mixer vehicle 110 is contemplated. This method comprises generating $CO_2$ emission using the concrete pump 118 and introducing $CO_2$ generated by the concrete pump 118 and output by the pump exhaust 119 into the mixer tank 116 using the one or more fluid pathways 270. This $CO_2$ mixes with the uncured cementitious material mixture 115 and carbonizes the uncured cementitious material mixture 115 to form $CaCO_3$ in the mixer tank 116.

In some embodiments, the method also includes capturing at least a portion of the $CO_2$ generated by the concrete pump 118 using the $CO_2$ capture unit 230, for example, before introducing the $CO_2$ into the mixer tank 116. After capture, $CO_2$ may be released from the $CO_2$ capture unit 230 and introduced into the mixer tank 116. For example, in the embodiment depicted in FIG. 3, releasing the $CO_2$ captured by the $CO_2$ capture unit 230 may comprise generating a fluid flow within the second fluid pathway 272 having a fluid flow rate greater than a release fluid flow rate using the first flow generation unit 242. Further, in embodiments comprising the $CO_2$ storage tank 250, the method may further include storing $CO_2$ generated by the concrete pump 118 in the $CO_2$ storage tank 250.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A vehicle $CO_2$ capture and utilization system comprising a concrete mixer vehicle and a vehicle exhaust capture system; wherein:
    the concrete mixer vehicle comprises a vehicle exhaust and a mixer tank;
    the vehicle exhaust capture system is located onboard the concrete mixer vehicle;
    the vehicle exhaust capture system comprises one or more fluid pathways that fluidly couple the vehicle exhaust and the mixer tank; and
    an auxiliary exhaust capture system that comprises one or more fluid pathways fluidly coupled to a pump exhaust of a concrete pump.

2. The vehicle $CO_2$ capture and utilization system of claim 1, wherein the mixer tank houses an uncured cementitious material mixture and when the concrete mixer vehicle generates $CO_2$ emission, at least a portion of $CO_2$ emission generated by the concrete mixer vehicle and output by the vehicle exhaust is introduced into the mixer tank and mixes with the uncured cementitious material mixture thereby carbonizing the uncured cementitious material mixture and forming $CaCO_3$ in the mixer tank.

3. The vehicle $CO_2$ capture and utilization system of claim 1, wherein:
    the vehicle exhaust capture system further comprises a $CO_2$ capture unit that is fluidly coupled to the vehicle exhaust and the mixer tank using the one or more fluid pathways; and
    the $CO_2$ capture unit is located onboard the concrete mixer vehicle and is structurally configured to capture $CO_2$.

4. The vehicle $CO_2$ capture and utilization system of claim 3, wherein the $CO_2$ capture unit comprises a housing and one or more carbon capturing structures located within the housing.

5. The vehicle $CO_2$ capture and utilization system of claim 4, wherein the one or more carbon capturing structures comprise amines, carbonate, ammonia, hydroxide, activated carbons, zeolites, metal organic frameworks, mesoporous structures, carbon capture filters, fibers, microporous structures, or a combination thereof.

6. The vehicle $CO_2$ capture and utilization system of claim 5, wherein the one or more carbon capturing structures are configured to capture $CO_2$ via adsorption, absorption, or a combination thereof.

7. The vehicle $CO_2$ capture and utilization system of claim 3, wherein:
    the one or more fluid pathways comprise a first fluid pathway extending from the vehicle exhaust to the $CO_2$ capture unit and a second fluid pathway extending from the $CO_2$ capture unit to the mixer tank;
    a flow generation unit is fluidly coupled to the second fluid pathway; and
    the flow generation unit is structurally configured to generate fluid flow from the $CO_2$ capture unit to the mixer tank.

8. The vehicle $CO_2$ capture and utilization system of claim 7, wherein the flow generation unit comprises a mass flow controller.

9. The vehicle $CO_2$ capture and utilization system of claim 1, wherein the vehicle exhaust capture system comprises a $CO_2$ storage tank fluidly coupled to the vehicle exhaust and located onboard the concrete mixer vehicle.

10. The vehicle $CO_2$ capture and utilization system of claim 9, wherein:
    the vehicle exhaust capture system further comprises a $CO_2$ capture unit that is fluidly coupled to the vehicle exhaust, the mixer tank, and the $CO_2$ storage tank using the one or more fluid pathways; and
    the $CO_2$ capture unit is located on the concrete mixer vehicle and is structurally configured capture $CO_2$.

11. The vehicle $CO_2$ capture and utilization system of claim 10, wherein:
    a fluid pathway extends between and fluidly couples the $CO_2$ capture unit and the $CO_2$ storage tank; and
    a flow generation unit is fluidly coupled to the fluid pathway that extends between and fluidly couples the $CO_2$ capture unit and the $CO_2$ storage tank and is structurally configured to generate fluid flow from the $CO_2$ capture unit to the $CO_2$ storage tank.

12. The vehicle $CO_2$ capture and utilization system of claim 10, wherein:
    a fluid pathway extends between and fluidly couples the $CO_2$ storage tank and the mixer tank; and
    a flow generation unit is fluidly coupled to the fluid pathway that extends between and fluidly couples the $CO_2$ storage tank and the mixer tank and is structurally configured to generate fluid flow from the $CO_2$ storage tank to the mixer tank.

13. The vehicle $CO_2$ capture and utilization system of claim 1, wherein the one or more fluid pathways of the auxiliary exhaust capture system fluidly couple the pump exhaust to the mixer tank.

14. The vehicle $CO_2$ capture and utilization system of claim 1, wherein the one or more fluid pathways of the auxiliary exhaust capture system fluidly couple the pump exhaust to a $CO_2$ storage tank, a mixing tank, or both.

15. A vehicle $CO_2$ capture and utilization system comprising a concrete mixer vehicle and a vehicle exhaust capture system; wherein:
   the concrete mixer vehicle comprises a combustion engine, a vehicle exhaust, and a mixer tank;
   the vehicle exhaust capture system comprises one or more fluid pathways that fluidly couple the vehicle exhaust and the mixer tank;
   the vehicle exhaust capture system comprises a $CO_2$ capture unit that is located onboard the concrete mixer vehicle and is fluidly coupled to the vehicle exhaust and the mixer tank using the one or more fluid pathways;
   the vehicle exhaust capture system comprises a $CO_2$ storage tank that is fluidly coupled to the vehicle exhaust using the one or more fluid pathways and is located onboard the concrete mixer vehicle;
   the one or more fluid pathways comprise a first fluid pathway extending from the vehicle exhaust to the $CO_2$ capture unit, a second fluid pathway extending from the $CO_2$ capture unit to the mixer tank, a third fluid pathway extending from the $CO_2$ capture unit to the $CO_2$ storage tank and a fourth fluid pathway extending from the $CO_2$ storage tank to the mixer tank;
   a first flow generation unit is fluidly coupled to the second fluid pathway to selectively generate fluid flow from the $CO_2$ capture unit to the mixer tank;
   a second flow generation unit is fluidly coupled to the third fluid pathway to selectively generate fluid flow from the $CO_2$ capture unit to the $CO_2$ storage tank; and
   a third flow generation unit is fluidly coupled to the fourth fluid pathway to selectively generate fluid flow from the $CO_2$ storage tank to the mixer tank.

16. The vehicle $CO_2$ capture and utilization system of claim 15, further comprising:
   a fifth fluid pathway extending from the vehicle exhaust to the mixer tank; and
   a valve fluidly coupled to the fifth fluid pathway to selectively generate fluid flow from the vehicle exhaust to the mixer tank.

17. The vehicle $CO_2$ capture and utilization system of claim 15, further comprising an auxiliary exhaust capture system that comprises one or more fluid pathways fluidly coupled to a pump exhaust of a concrete pump.

* * * * *